(12) United States Patent
Bertrand et al.

(10) Patent No.: US 10,568,033 B2
(45) Date of Patent: Feb. 18, 2020

(54) CONTEXT-DRIVEN CONNECTION PROTOCOL

(71) Applicants: Yan Bertrand, Toulouse (FR); Anna-Marie Mansour, Seattle, WA (US); Kahyun Kim, Portland, OR (US); Intel Corporation, Santa Clara, CA (US)

(72) Inventors: Yan Bertrand, Toulouse (FR); Anna-Marie Mansour, Seattle, WA (US); Kahyun Kim, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/060,334

(22) PCT Filed: Dec. 23, 2015

(86) PCT No.: PCT/US2015/000271
§ 371 (c)(1),
(2) Date: Jun. 7, 2018

(87) PCT Pub. No.: WO2017/111785
PCT Pub. Date: Jun. 29, 2017

(65) Prior Publication Data
US 2018/0376424 A1 Dec. 27, 2018

(51) Int. Cl.
*H04W 52/02* (2009.01)
*H04W 76/14* (2018.01)
*H04W 4/80* (2018.01)
*H04W 4/029* (2018.01)
(Continued)

(52) U.S. Cl.
CPC ....... *H04W 52/0254* (2013.01); *H04W 4/027* (2013.01); *H04W 4/029* (2018.02); *H04W 4/80* (2018.02); *H04W 76/14* (2018.02); *H04W 76/10* (2018.02)

(58) Field of Classification Search
None
See application file for complete search history.

(56) References Cited

U.S. PATENT DOCUMENTS

| 9,179,254 | B1 | 11/2015 | Viswanadham |
| 2007/0238475 | A1 | 10/2007 | Goedken |

(Continued)

FOREIGN PATENT DOCUMENTS

| JP | 2009152663 A | 7/2009 |
| WO | WO-2017111785 A1 | 6/2017 |

OTHER PUBLICATIONS

"International Application Serial No. PCT/US2015/000271, International Search Report dated Sep. 19, 2016", 3 pgs.
(Continued)

*Primary Examiner* — Eunsook Choi
(74) *Attorney, Agent, or Firm* — Schwegman Lundberg & Woessner, P.A.

(57) ABSTRACT

Various systems and methods for implementing a context-driven connection protocol are described herein. A system for controlling wireless communication includes a motion detector to detect motion at a mobile device; and a wireless transceiver controller to allow a wireless connection to be established between the mobile device and a second device in response to the motion being detected.

23 Claims, 5 Drawing Sheets

(51) Int. Cl.
   *H04W 4/02*   (2018.01)
   *H04W 76/10*  (2018.01)

(56) References Cited

U.S. PATENT DOCUMENTS

| | | | |
|---|---|---|---|
| 2009/0221275 A1* | 9/2009 | Trip | H04M 1/7253 |
| | | | 455/418 |
| 2014/0018000 A1 | 1/2014 | Seymour et al. | |
| 2014/0355582 A1* | 12/2014 | Kamath | H04W 84/20 |
| | | | 370/338 |
| 2015/0045021 A1 | 2/2015 | Schlatter et al. | |
| 2017/0142543 A1* | 5/2017 | Ossin | H04W 4/80 |
| 2019/0064510 A1* | 2/2019 | Flohr | G02B 26/10 |
| 2019/0118767 A1* | 4/2019 | Britt | B60R 25/24 |

OTHER PUBLICATIONS

"International Application Serial No. PCT/US2015/000271, Written Opinion dated Sep. 19, 2016", 5 pgs.

* cited by examiner

CONTEXT-DRIVEN CONNECTION PROTOCOL

CLAIM OF PRIORITY

This patent application is a U.S. National Stage Application under 35 U.S.C. 371 from International Application No. PCT/US2015/000271, filed Dec. 23, 2015, published as WO 2017/111785, which is incorporated herein by reference.

TECHNICAL FIELD

Embodiments described herein generally relate to wireless devices and in particular, to implementing a context-driven connection protocol.

BACKGROUND

A wireless personal area network (WPAN) is a computer network of information technology devices in the range of an individual person. A WPAN may include private-use devices such as mobile phones, wireless headphones, fitness trackers, and smartwatches. Some devices in a WPAN may only allow a single device of a certain type to connect. For example, many smartphones only allow for one pair of Bluetooth headphones to be connected at a given time.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

As users adopt more wireless devices into everyday use, the number of devices available to connect to a hub device increases. Headphones, eyeglasses, watches, and even smartphones have become fashion accessories. In the case of wireless devices in a WPAN, a person may have several pairs of wireless headphones that are able to connect to a portable media player (e.g., smartphone, MP3 player, etc.). However, only a single pair of headphones may be able to actively connect to the media player at a given time. Similarly, a person may own several smartwatches and the hub device (e.g., smartphone) may only allow for one active connection at a time.

Managing multiple devices of the same type may be cumbersome. The user may have to go into their hub device (e.g., mobile phone) or accompanying app and manually connect to the desired device (and possibly disconnect from other unwanted devices). What is needed is an efficient and simple mechanism to handle multiple devices in this scenario.

Systems and methods described herein implement a context-driven connection protocol for wireless devices. A device may detect accelerometer readings indicating that the device has moved. The accelerometer readings may indicate that the user has picked up the device with the intent to use it. In the case of a wearable device such as a smartwatch, the accelerometer readings may indicate that the user intends to place it on her wrist. Thus, in a situation where the user has multiple smartwatches, the one that is picked up and registers accelerometer readings, will begin to allow wireless connections. Subsequently, the smartwatch that began moving may connect to the user's smartphone or other mobile device in the WPAN. Other functionalities are described in the discussion below.

Figure 1A:
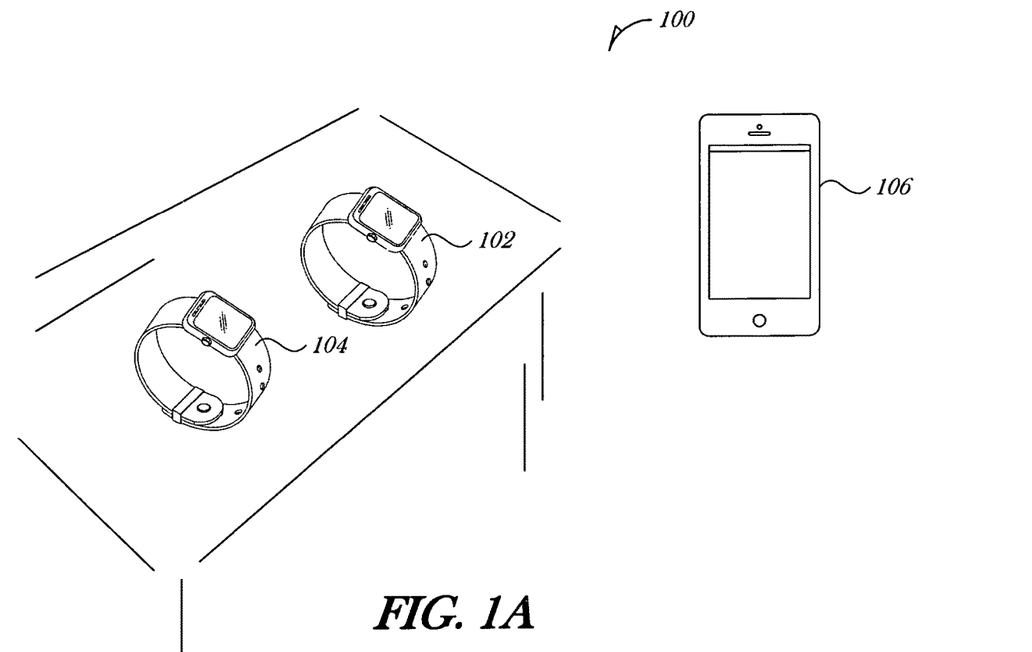
FIGS. 1A-1B are schematic drawings illustrating a system to implement a context-driven connection protocol for wireless devices, according to an embodiment.
Figure 1B:
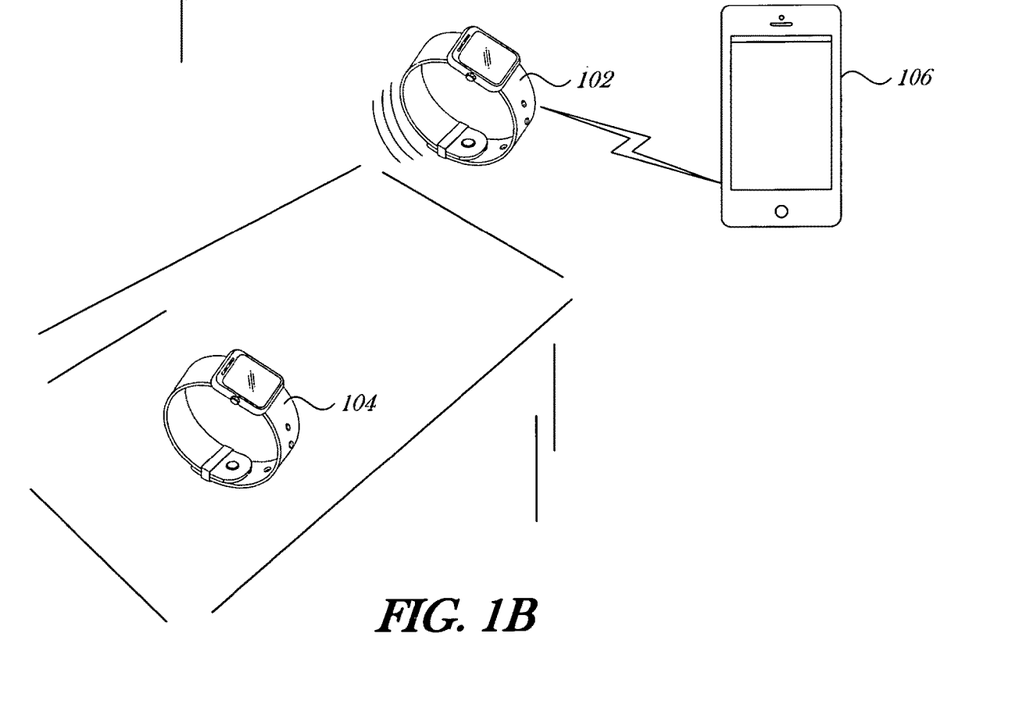

FIGS. 1A-1B are schematic drawings illustrating a system 100 to implement a context-driven connection protocol for wireless devices, according to an embodiment. In FIG. 1A, two smartwatches 102, 104 are resting on a surface, such as a table or a desk. The smartwatches 102, 104 may have been previously associated with a mobile device 106. The association may be a Bluetooth pairing in some examples. When a user picks up one of the smartwatches 102, the accelerometer in the smartwatch 102 detects the movement and prepares the smartwatch 102 to connect over a wireless connection. In the example illustrated in FIG. 1B, the smartwatch 102 is moved and as a result, connects to the mobile device 106. For instance, the smartwatch 102 may be Bluetooth Low Energy (BLE) enabled, and when the accelerometer registers movement, which may be a threshold amount of movement, the smartwatch 102 begins broadcasting advertising packets over one or several of the Bluetooth advertising channels according to the Bluetooth advertising protocol. Upon receiving a BLE advertisement the mobile device 106 may initiate a connection with the smartwatch 102. Note that the smartwatch 104 will not be connected to the mobile device 106 because it is not advertising (because it has not moved).

Should both devices move at approximately the same time (e.g., the user picks up both devices simultaneously), then each may begin advertising and the scanning device (e.g., the mobile device 106) may connect with one of the smartwatches 102, 104 according to the existing Bluetooth protocol. BLE incorporates a random element to delay between advertising packets in the advertising protocol. As such, one of the smartwatches 102, 104 will broadcast an advertisement packet first, but which one will actually do it will be randomly determined based on the built-in advertising delay in the BLE protocol. The user may configure a priority list on the mobile device 106 to preferentially connect with one device over another.

Figure 2A:
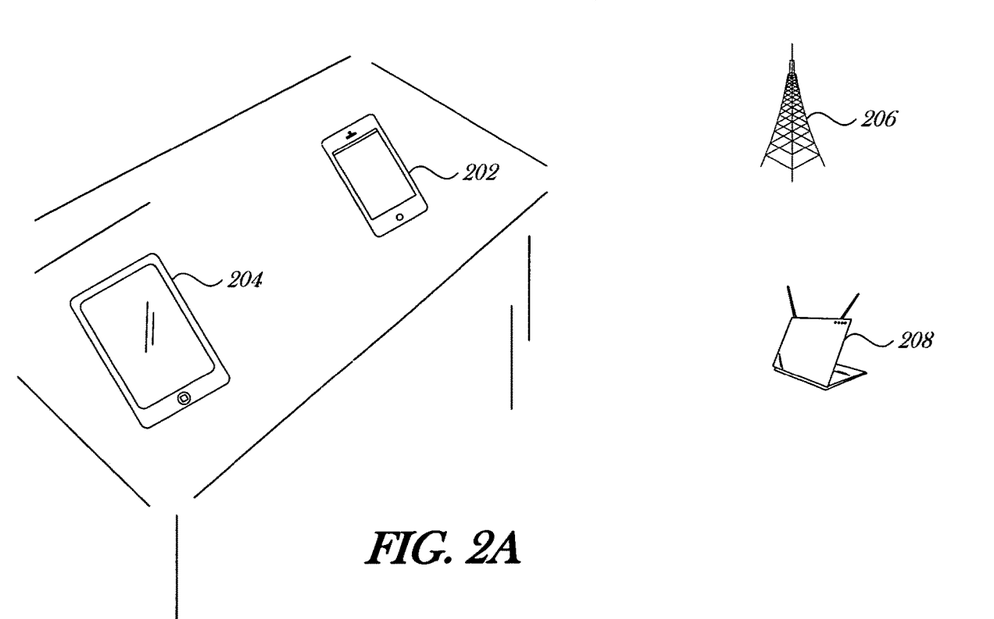
FIGS. 2A-2B are schematic drawings illustrating a system to implement a context-driven connection protocol for wireless devices, according to an embodiment.

FIGS. 2A-2B are schematic drawings illustrating a system 200 to implement a context-driven connection protocol for wireless devices, according to an embodiment. In FIG. 2A, two mobile devices are depicted, a smartphone 202 and a tablet 204. The system 200 also includes a cellular base station 206 for cellular connections and a router 208 for Wi-Fi network connections. The cellular base station 206 may provide various cellular network infrastructures, such as 3G, and 4G LTE/LTE-A, or WiMAX networks. The router 208 may provide network support for various Internet Protocol networks, such as TCP, UDP, IPv4, IPv6, or IEEE 802.11 networking standards.

Figure 2B:
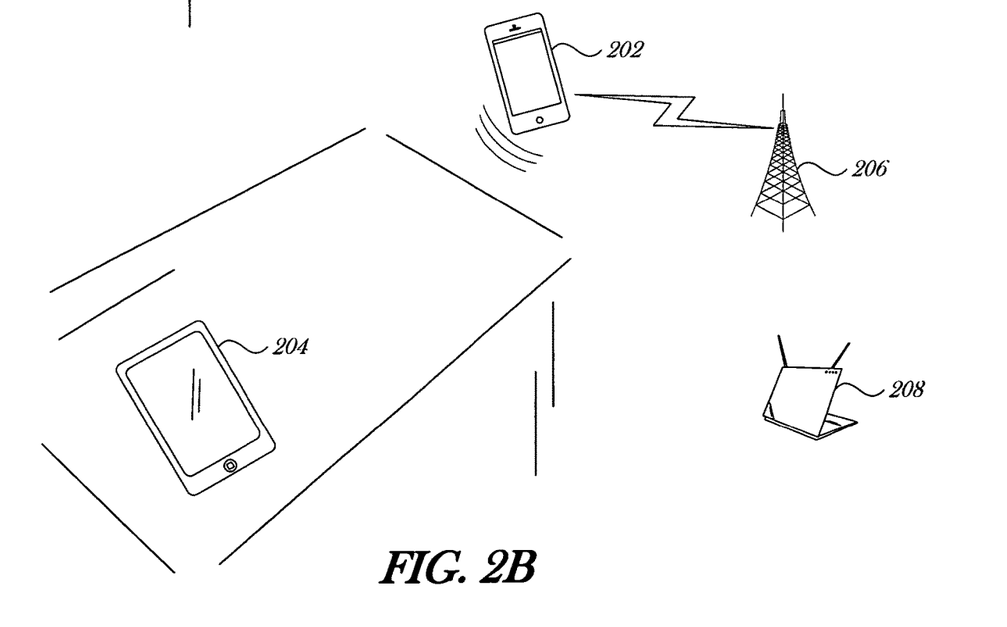

As depicted in FIG. 2B, when the user picks up the smartphone 202, it activates its cellular radio and initiates a connection with the base station 206. Alternatively, if the smartphone 202 was connected to the Wi-Fi router 208, then it may connect to the local area network instead or in addition to the cellular connection. Other connection scenarios are possible as well.

Figure 3:
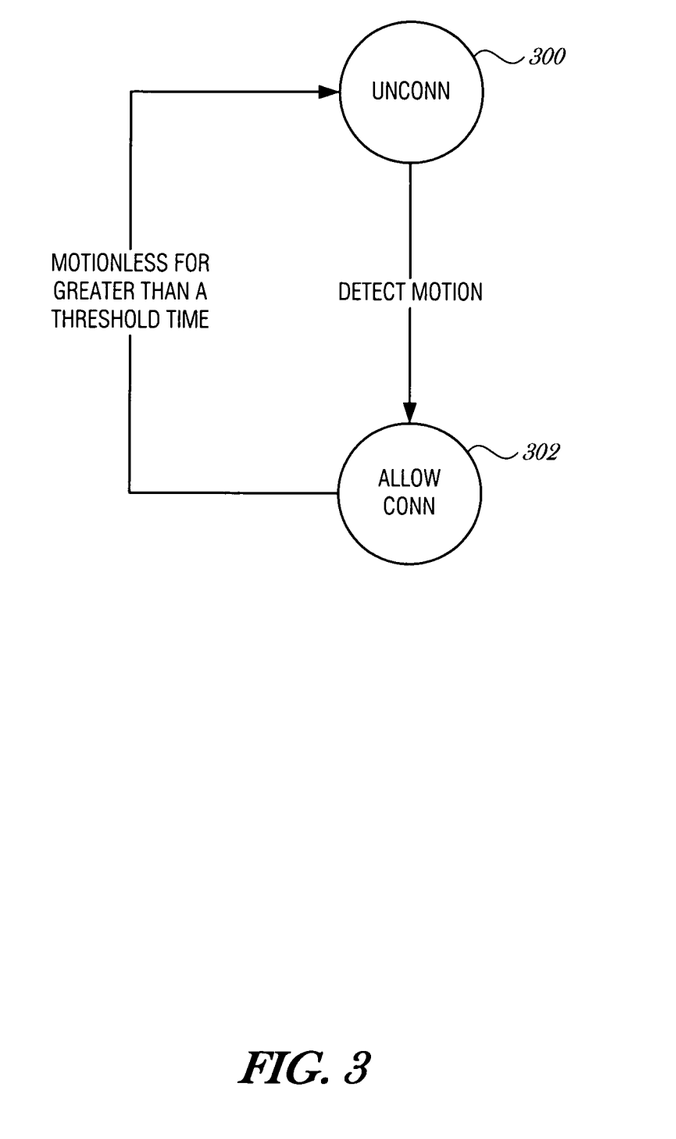
FIG. 3 is a state diagram control and data flow, according to an embodiment. Initially, a wireless device is in an unconnected state with at least one wireless network.

FIG. 3 is a state diagram control and data flow, according to an embodiment. Initially, a wireless device is in an unconnected state 300 with at least one wireless network. The wireless device may be any type of device including a wearable device (e.g., smartwatch, smartglasses, headphones), a mobile user device (e.g., a smartphone, tablet, laptop, hybrid device), or other devices (e.g., a wireless mouse). The wireless device is equipped with at least an accelerometer, although it may also include a gyroscope, a magnetometer, a proximity sensor, or position determination devices (e.g., GPS receiver).

When in an unconnected state 300, the wireless device does not advertise for connections, receive invitations to connect, or otherwise attempt to initiate a connection with another device. By suppressing connections, the wireless device is able to efficiently allocate limited power resources, slow battery drain, and provide a more seamless user experience for the user who may be deciding between multiple devices.

The wireless device may be in an unconnected state 300 with respect to one network interface (e.g., Wi-Fi) but in an active connected state with another network interface (e.g., cellular). In a related example, the wireless device may disable all network interfaces when in the unconnected state 300.

To implement the unconnected state 300, the wireless device may disable one or more radios; unload or suppress communication with a hardware abstraction layer, device driver, or other software construct; or actively deny or decline invitations to connect at an application, network, or other interface layer. The mechanism to remain in the unconnected state 300 may be at least partially dependent on the communication protocol being disabled.

When the wireless device detects motion, then the device transitions from the unconnected state 300 to an allow connections state 302. In various embodiments, the duration, intensity, patterns, or other aspects of the motion may be analyzed to determine whether the device is to transition from the unconnected state 300 to the allow connections state 302. For example, the motion may be analyzed to determine whether it may indicate that the wireless device is being shaken, flipped over, spun, carried, or the like. Motion analysis may be used to reduce or eliminate the number of false detections where a user is not actually going to begin use of the wireless device.

When an appropriate triggering motion is detected, the wireless device transitions to allow connections state 302. In the allow connections state 302 the wireless device may invite connections, seek connections, or otherwise provide mechanism to allow the wireless device to connect to one or more wireless network devices.

Bluetooth Low Energy (BLE) also referred to as Bluetooth Smart, operates in the unlicensed 2.4 GHz ISM (Industrial Scientific Medical) band. When a device is ready for a connection it may transmit advertising channel packets on one or more reserved advertising channels in the 2400-2483.5 MHz operational bandwidth. In BLE there are a total of forty data and advertising channels, each being 2 Mhz, and with channels 37, 38, and 39 are used as advertising channels and they correspond to RF center frequencies of 2402 Mhz, 2026 Mhz, and 2480 Mhz. Devices that advertise on an advertising RF channel is referred to as an advertiser and devices that receive advertising packets on the advertising channels with an intent to connect to an advertiser is known as an initiator. When an initiator receives an advertising packet of interest, then the initiator may request a connection over the same advertising RF channel on which it received the connectable advertising packet. Thus, in a BLE context, the wireless device may activate advertising services on advertising channels when in allow connections state 302.

Advertising services in BLE may be disabled at the host controller interface level or at the physical link layer. As an example, the wireless device may power on the BLE radio (e.g., physical link) to enable advertising services. As another example, the wireless device may activate advertising services through an application program interface (API), device driver, host controller interface, or some other programmatic controller.

As another mechanism to enable and disable connectability, the Bluetooth advertising packet may be modified to indicate whether accelerometer readings were present. As such, a listening device, such as a smartphone, may selectively initiate a connection with an advertiser that indicates that it has or is being moved.

In the case of a Wi-Fi network adapter or a cellular network adapter, similar mechanism may be used to enable or disable connections and connectability of the wireless device to other devices. For example, when in the unconnected state 300, the wireless device may disable the cellular radio. After detecting appropriate triggering motion, the wireless device may activate the cellular radio and connect with a base station to provide cellular service.

If the wireless device is motionless for greater than a threshold time, then the wireless device may transition from the allow connections state 302 to the unconnected state 300. Being immobile for some period of time may indicate that the wireless device is no longer in use. The time may be sufficiently long to avoid false trigger events. For example, the threshold timeout may be six hours. Similar to the motion analysis to transition from state 300 to state 302, the motionless analysis may include analyzing patterns or detecting less than a threshold amount of motion for a period. In other words, being absolutely stationary or immobile may not be the necessary indication that the wireless device is no longer in use. Minor movements may be disregarded in order to reduce or eliminate the number of false detections where a user is not actually going to continue use of the wireless device.

In this manner, a user may own two smartwatches that connect to the same smartphone. The smartwatches may be placed on top of a wireless charger overnight. In the morning, the user may choose one of the smartwatches to wear for the day. When the selected watch registers the accelerometer readings, it advertises and connects to the phone. The other watch that did not get picked up by the user does not interfere because it is not advertising.

If instead of turning on and off advertising, a modified advertisement packet is used, then the watch that is picked up may modify its advertising packet to indicate that it is moving or was moved. This signifies an intent to use on the part of the user. Thus, the smartphone may connect to the watch that was picked up based on the advertising packet's modified payload. The other watch that did not get picked up does not interfere because despite its advertising, no accelerometer movement was detected (and no data was presented in its advertising packet) and therefore, it is assumed that it is not the watch being actively used.

It is understood that other wireless network technologies may be used in the manner described to decrease power consumption and increase user experience, such as ZigBee, Bluetooth, BLE, Symphony, 6LoWPAN, etc.

Figure 4:
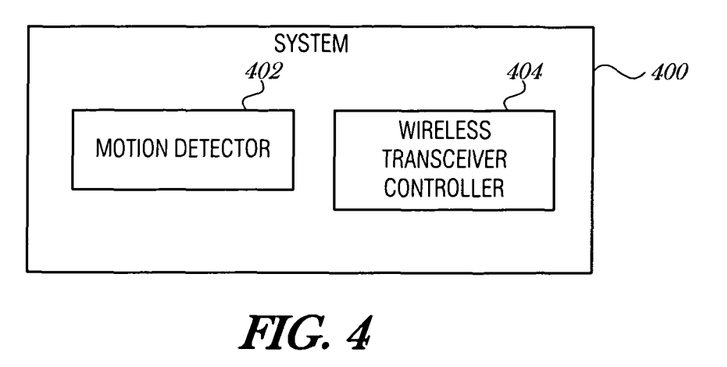
FIG. 4 is a block diagram illustrating a system for controlling wireless communication, according to an embodiment.

FIG. 4 is a block diagram illustrating a system 400 for controlling wireless communication, according to an embodiment. The system 400 includes a motion detector 402 and a wireless transceiver controller 404.

The motion detector 402 may detect motion at a mobile device. The motion detector 402 may be coupled to an accelerometer, gyroscope, IMU, or the like. Various accelerometer patterns may be sensed and interpreted as different types of motion. In an embodiment, to detect the motion, the motion detector is to receive accelerometer data indicating that the mobile device is being shaken. In a related embodiment, to detect the motion, the motion detector is to receive accelerometer data indicating that the mobile device has been moved from a resting position. Other movement may be classified and used to trigger the wireless transceiver controller 404, such as turning the mobile device over (from front to back or vice versa), spinning the mobile device, moving the mobile device for a threshold amount of time (e.g., for ten seconds), or the like.

The mobile device may be any type of mobile device capable of registering movement and establishing a wireless connection. Examples of mobile devices include, but are not limited to mobile phones, smartphones, smartglasses, headphones, smartwatches, mice, etc.

The wireless transceiver controller 404 may be configured to allow a wireless connection to be established between the mobile device and a second device in response to the motion being detected.

In an embodiment, to allow the wireless connection to be established, the wireless transceiver controller 404 is to activate an advertising protocol and wait for a connection request from the second device. For example, in a BLE device, the wireless transceiver controller 404 may activate the advertising protocol by turning on the radio, sending a low-level control to activate advertising, changing a device's role, etc. Thus, in an embodiment, to activate the advertising protocol, the wireless transceiver controller 404 is to power on a radio system. In a related embodiment, the radio system comprises a Bluetooth radio. In another related embodiment, the radio system comprises a Wi-Fi radio. In another related embodiment, the radio system comprises a cellular radio.

In an embodiment, to power on the radio system, the wireless transceiver controller 404 is to activate a Bluetooth adapter. The wireless transceiver controller 404 may issue device commands, such as "btAdapter=BluetoothAdapter.getDefaultAdapter( ); btAdapter.enable( );" to enable a Bluetooth radio in an Android device.

One mechanism to disable and enable radios may be to put a device into sleep mode and then later wake it, respectively. Thus, in an embodiment, to activate the advertising protocol, the wireless transceiver controller 404 is to wake the mobile device from a sleep mode.

In an embodiment, to allow the wireless connection to be established, the wireless transceiver controller is to broadcast an advertisement with a payload indicating that the mobile device is ready for connections and wait for a connection request from the second device. In some advertising PDUs (packet data units), the information permitted is somewhat limited. However, a naming protocol may be established to indicate when a device is ready to accept connections. Potential master devices (in the parlance of the Bluetooth specification) may have to be configured specially to analyze the name of the advertiser and only attempt to initiate connections with advertisers that provide specific name types. For example, if the actual name of a device is "JANE_HEADPHONE" then a derivative name may be "JANE_HEADPHONE_RFC", where "RFC" is short for "ready for connection" and the derivative name is used only after a triggering motion is detected by the motion detector 402. Thus, in an embodiment, the payload indicating that the mobile device is ready for connections includes a derivative name of the mobile device, the derivative name being formed from a configured device name. Other naming conventions and packet encoding may be used to indicate when an advertiser is ready for connections.

In an embodiment, the second device is a device acting as a Bluetooth host device.

In an embodiment, the wireless transceiver controller 404 is to disable wireless connections after a threshold time of no detected motion. Thus, after not being in use for a while (e.g., while on a nightstand overnight), the mobile device may power down certain systems, such as the wireless radios, background services, and the like, to preserve battery. Alternatively, the mobile device may cease transmitting signals, while leaving the radio powered on. The threshold time may be configurable and may be set to as little as several minutes or as long as several days.

Figure 5:
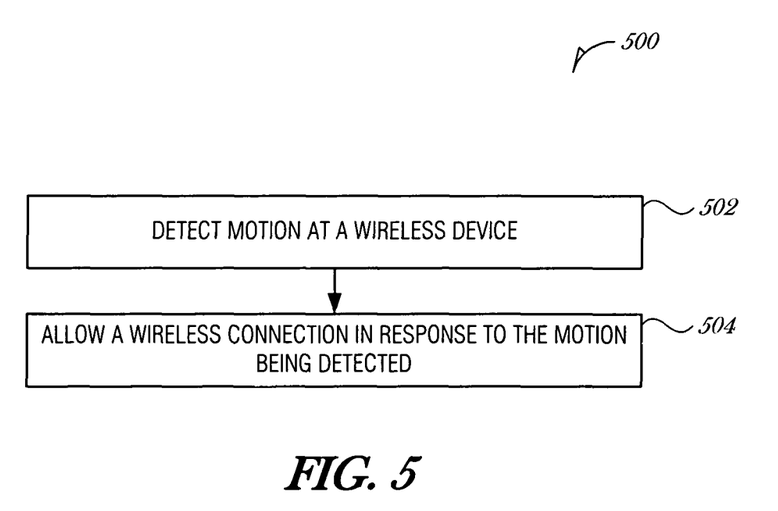
FIG. 5 is a flowchart illustrating a method 500 of controlling wireless communication, according to an embodiment.

FIG. 5 is a flowchart illustrating a method 500 of controlling wireless communication, according to an embodiment. At block 502, motion is detected at a mobile device. In an embodiment, detecting the motion comprises receiving accelerometer data indicating that the mobile device is being shaken. In a related embodiment, detecting the motion comprises receiving accelerometer data indicating that the mobile device has been moved from a resting position.

At block 504, a wireless connection is allowed to be established between the mobile device and a second device in response to the motion being detected.

In an embodiment, allowing the wireless connection to be established comprises activating an advertising protocol and waiting for a connection request from the second device. In a further embodiment, activating the advertising protocol comprises powering on a radio system. In a further embodiment, the radio system comprises a Bluetooth radio. In a related embodiment, the radio system comprises a Wi-Fi radio. In another related embodiment, the radio system comprises a cellular radio.

In an embodiment, powering on the radio system comprises activating a Bluetooth adapter.

In an embodiment, activating the advertising protocol comprises waking the mobile device from a sleep mode.

In an embodiment, allowing the wireless connection to be established comprises broadcasting an advertisement with a payload indicating that the mobile device is ready for connections and waiting for a connection request from the second device. In a further embodiment, the payload indicates that the mobile device is ready for connections by using a derivative name of the mobile device, the derivative name being formed from a configured device name.

In an embodiment, the second device is a device acting as a Bluetooth host device.

In an embodiment, the method 500 includes disabling wireless connections after a threshold time of no detected motion.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 6:
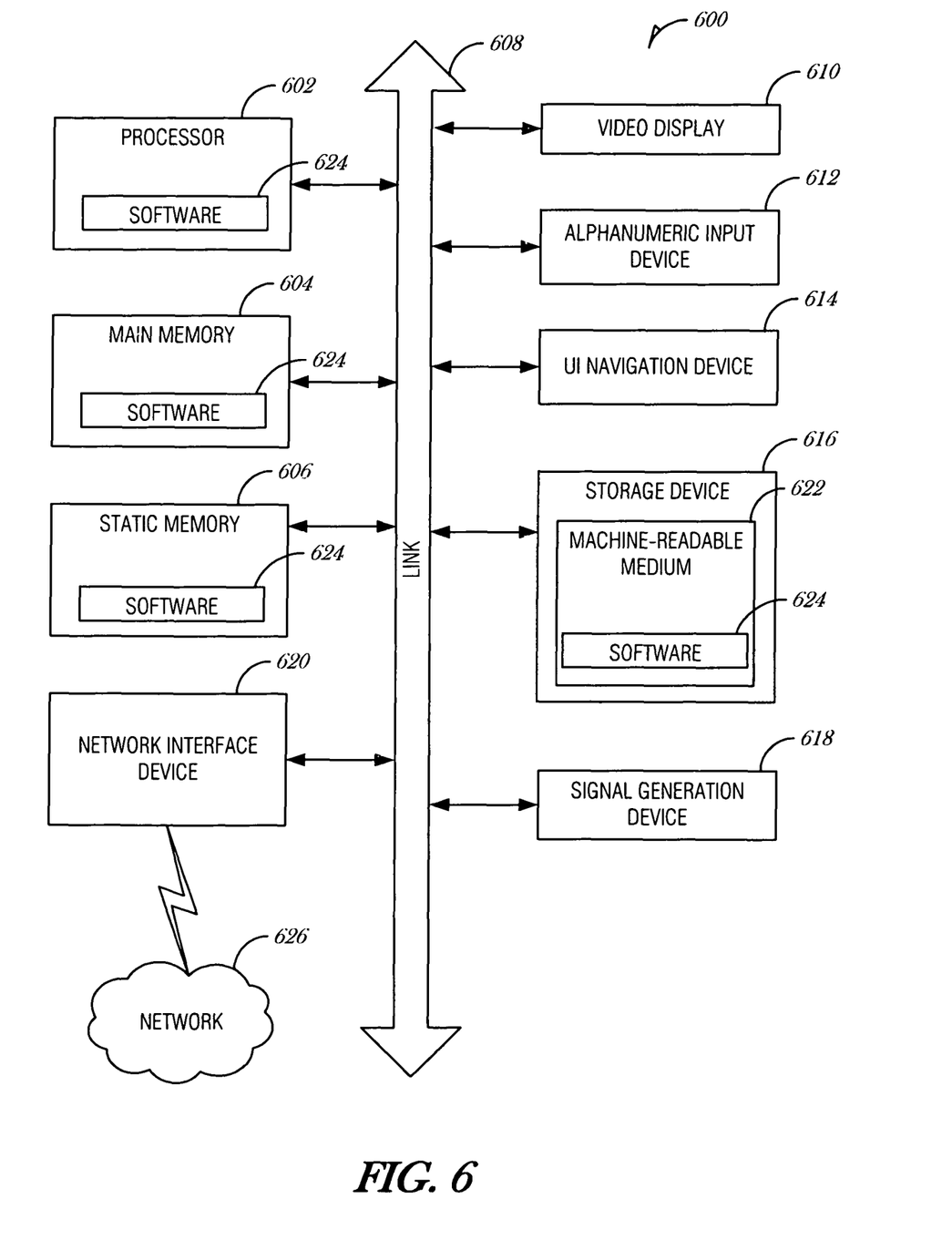
FIG. 6 is a block diagram illustrating an example machine upon which any one or more of the techniques (e.g., methodologies) discussed herein may perform, according to an example embodiment.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In an embodiment, the video display unit 610, input device 612 and UT navigation device 614 are incorporated into a touch screen display. In another embodiment, the video display unit 610 includes two LEDs and a haptic vibrator. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, ZigBee, 6LoWPAN, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 includes subject matter (such as a device, apparatus, or machine) for controlling wireless communication comprising: a motion detector to detect motion at a mobile device; and a wireless transceiver controller to allow a wireless connection to be established between the mobile device and a second device in response to the motion being detected.

In Example 2, the subject matter of Example 1 may include, wherein to detect the motion, the motion detector is to receive accelerometer data indicating that the mobile device is being shaken.

In Example 3, the subject matter of any one of Examples 1 to 2 may include, wherein to detect the motion, the motion detector is to receive accelerometer data indicating that the mobile device has been moved from a resting position.

In Example 4, the subject matter of any one of Examples 1 to 3 may include, wherein to allow the wireless connection to be established, the wireless transceiver controller is to: activate an advertising protocol; and wait for a connection request from the second device.

In Example 5, the subject matter of any one of Examples 1 to 4 may include, wherein to activate the advertising protocol, the wireless transceiver controller is to power on a radio system.

In Example 6, the subject matter of any one of Examples 1 to 5 may include, wherein the radio system comprises a Bluetooth radio.

In Example 7, the subject matter of any one of Examples 1 to 6 may include, wherein the radio system comprises a Wi-Fi radio.

In Example 8, the subject matter of any one of Examples 1 to 7 may include, wherein the radio system comprises a cellular radio.

In Example 9, the subject matter of any one of Examples 1 to 8 may include, wherein to power on the radio system, the wireless transceiver controller is to activate a Bluetooth adapter.

In Example 10, the subject matter of any one of Examples 1 to 9 may include, wherein to activate the advertising protocol, the wireless transceiver controller is to wake the mobile device from a sleep mode.

In Example 11, the subject matter of any one of Examples 1 to 10 may include, wherein to allow the wireless connection to be established, the wireless transceiver controller is to: broadcast an advertisement with a payload indicating that the mobile device is ready for connections; and wait for a connection request from the second device.

In Example 12, the subject matter of any one of Examples 1 to 11 may include, wherein the payload indicating that the mobile device is ready for connections comprises a derivative name of the mobile device, the derivative name being formed from a configured device name.

In Example 13, the subject matter of any one of Examples 1 to 12 may include, wherein the second device is a device acting as a Bluetooth host device.

In Example 14, the subject matter of any one of Examples 1 to 13 may include, wherein the wireless transceiver controller is to disable wireless connections after a threshold time of no detected motion.

Example 15 includes subject matter (such as a method, means for performing acts, machine readable medium including instructions that when performed by a machine cause the machine to performs acts, or an apparatus to perform) for controlling wireless communication comprising: detecting motion at a mobile device; and allowing a wireless connection to be established between the mobile device and a second device in response to the motion being detected.

In Example 16, the subject matter of Example 15 may include, wherein detecting the motion comprises receiving accelerometer data indicating that the mobile device is being shaken.

In Example 17, the subject matter of any one of Examples 15 to 16 may include, wherein detecting the motion comprises receiving accelerometer data indicating that the mobile device has been moved from a resting position.

In Example 18, the subject matter of any one of Examples 15 to 17 may include, wherein allowing the wireless connection to be established comprises: activating an advertising protocol; and waiting for a connection request from the second device.

In Example 19, the subject matter of any one of Examples 15 to 18 may include, wherein activating the advertising protocol comprises powering on a radio system.

In Example 20, the subject matter of any one of Examples 15 to 19 may include, wherein the radio system comprises a Bluetooth radio.

In Example 21, the subject matter of any one of Examples 15 to 20 may include, wherein the radio system comprises a Wi-Fi radio.

In Example 22, the subject matter of any one of Examples 15 to 21 may include, wherein the radio system comprises a cellular radio.

In Example 23, the subject matter of any one of Examples 15 to 22 may include, wherein powering on the radio system comprises activating a Bluetooth adapter.

In Example 24, the subject matter of any one of Examples 15 to 23 may include, wherein activating the advertising protocol comprises waking the mobile device from a sleep mode.

In Example 25, the subject matter of any one of Examples 15 to 24 may include, wherein allowing the wireless connection to be established comprises: broadcasting an advertisement with a payload indicating that the mobile device is ready for connections; and waiting for a connection request from the second device.

In Example 26, the subject matter of any one of Examples 15 to 25 may include, wherein the payload indicating that the mobile device is ready for connections comprises a derivative name of the mobile device, the derivative name being formed from a configured device name.

In Example 27, the subject matter of any one of Examples 15 to 26 may include, wherein the second device is a device acting as a Bluetooth host device.

In Example 28, the subject matter of any one of Examples 15 to 27 may include, disabling wireless connections after a threshold time of no detected motion.

Example 29 includes at least one machine-readable medium including instructions, which when executed by a machine, cause the machine to perform operations of any of the Examples 15-28.

Example 30 includes an apparatus comprising means for performing any of the Examples 15-28.

Example 31 includes subject matter (such as a device, apparatus, or machine) for controlling wireless communication comprising: means for detecting motion at a mobile device; and means for allowing a wireless connection to be established between the mobile device and a second device in response to the motion being detected.

In Example 32, the subject matter of Example 31 may include, wherein the means for detecting the motion comprise means for receiving accelerometer data indicating that the mobile device is being shaken.

In Example 33, the subject matter of any one of Examples 31 to 32 may include, wherein the means for detecting the motion comprise means for receiving accelerometer data indicating that the mobile device has been moved from a resting position.

In Example 34, the subject matter of any one of Examples 31 to 33 may include, wherein the means for allowing the wireless connection to be established comprise: means for activating an advertising protocol; and means for waiting for a connection request from the second device.

In Example 35, the subject matter of any one of Examples 31 to 34 may include, wherein the means for activating the advertising protocol comprise means for powering on a radio system.

In Example 36, the subject matter of any one of Examples 31 to 35 may include, wherein the radio system comprises a Bluetooth radio.

In Example 37, the subject matter of any one of Examples 31 to 36 may include, wherein the radio system comprises a Wi-Fi radio.

In Example 38, the subject matter of any one of Examples 31 to 37 may include, wherein the radio system comprises a cellular radio.

In Example 39, the subject matter of any one of Examples 31 to 38 may include, wherein the means for powering on the radio system comprise means for activating a Bluetooth adapter.

In Example 40, the subject matter of any one of Examples 31 to 39 may include, wherein the means for activating the advertising protocol comprise means for waking the mobile device from a sleep mode.

In Example 41, the subject matter of any one of Examples 31 to 40 may include, wherein the means for allowing the wireless connection to be established comprise: means for broadcasting an advertisement with a payload indicating that the mobile device is ready for connections; and means for waiting for a connection request from the second device.

In Example 42, the subject matter of any one of Examples 31 to 41 may include, wherein the payload indicating that the mobile device is ready for connections comprises a derivative name of the mobile device, the derivative name being formed from a configured device name.

In Example 43, the subject matter of any one of Examples 31 to 42 may include, wherein the second device is a device acting as a Bluetooth host device.

In Example 44, the subject matter of any one of Examples 31 to 43 may include, means for disabling wireless connections after a threshold time of no detected motion.

Example 45 includes subject matter (such as a device, apparatus, or machine) for controlling wireless communication comprising: a processor subsystem; a memory including instructions, which when executed by the processor subsystem, cause the processor subsystem to: detect motion at a mobile device; and allow a wireless connection to be established between the mobile device and a second device in response to the motion being detected.

In Example 46, the subject matter of Example 45 may include, wherein the instructions to detect the motion comprise instructions to receive accelerometer data indicating that the mobile device is being shaken.

In Example 47, the subject matter of any one of Examples 45 to 46 may include, wherein the instructions to detect the motion comprise instructions to receive accelerometer data indicating that the mobile device has been moved from a resting position.

In Example 48, the subject matter of any one of Examples 45 to 47 may include, wherein the instructions to allow the wireless connection to be established comprise instructions to: activate an advertising protocol; and wait for a connection request from the second device.

In Example 49, the subject matter of any one of Examples 45 to 48 may include, wherein the instructions to activating the advertising protocol comprise instructions to power on a radio system.

In Example 50, the subject matter of any one of Examples 45 to 49 may include, wherein the radio system comprises a Bluetooth radio.

In Example 51, the subject matter of any one of Examples 45 to 50 may include, wherein the radio system comprises a Wi-Fi radio.

In Example 52, the subject matter of any one of Examples 45 to 51 may include, wherein the radio system comprises a cellular radio.

In Example 53, the subject matter of any one of Examples 45 to 52 may include, wherein the instructions to power on the radio system comprise instructions to activate a Bluetooth adapter.

In Example 54, the subject matter of any one of Examples 45 to 53 may include, wherein the instructions to activate the advertising protocol comprise instructions to wake the mobile device from a sleep mode.

In Example 55, the subject matter of any one of Examples 45 to 54 may include, wherein the instructions to allow the wireless connection to be established comprise instructions to: broadcast an advertisement with a payload indicating that the mobile device is ready for connections; and wait for a connection request from the second device.

In Example 56, the subject matter of any one of Examples 45 to 55 may include, wherein the payload indicating that the mobile device is ready for connections comprises a derivative name of the mobile device, the derivative name being formed from a configured device name.

In Example 57, the subject matter of any one of Examples 45 to 56 may include, wherein the second device is a device acting as a Bluetooth host device.

In Example 58, the subject matter of any one of Examples 45 to 57 may include, instructions to disable wireless connections after a threshold time of no detected motion.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for controlling wireless communication, the system comprising:
    an electronic motion detector to detect motion at a mobile device; and
    an electronic wireless transceiver controller to allow a wireless connection to be established between the mobile device and a second device in response to the motion being detected,
    wherein to allow the wireless connection to be established, the wireless transceiver controller is to:
        broadcast an advertisement with a payload indicating that the mobile device is ready for connections, wherein the payload comprises a derivative name of the mobile device, the derivative name being formed from a configured device name, the derivative name including a portion that indicates that the mobile device is ready for connections; and
        wait for a connection request from the second device.

2. The system of claim 1, wherein to detect the motion, the electronic motion detector is to receive accelerometer data indicating that the mobile device is being shaken.

3. The system of claim 1, wherein to detect the motion, the electronic motion detector is to receive accelerometer data indicating that the mobile device has been moved from a resting position.

4. The system of claim 1, wherein to allow the wireless connection to be established, the electronic wireless transceiver controller is to:
    activate an advertising protocol; and
    wait for a connection request from the second device.

5. The system of claim 4, wherein to activate the advertising protocol, the electronic wireless transceiver controller is to power on a radio system.

6. The system of claim 5, wherein the radio system comprises a Bluetooth radio.

7. The system of claim 5, wherein to power on the radio system, the electronic wireless transceiver controller is to activate a Bluetooth adapter.

8. The system of claim 4, wherein to activate the advertising protocol, the electronic wireless transceiver controller is to wake the mobile device from a sleep mode.

9. The system of claim 1, wherein the configured name is used when the mobile device is not ready for connections.

10. A method of controlling wireless communication, the method comprising:
    detecting motion at a mobile device; and
    allowing a wireless connection to be established between the mobile device and a second device in response to the motion being
    wherein allowing the wireless connection to be established comprises:
        broadcasting an advertisement with a payload indicating that the mobile device is ready for connections, wherein the payload comprises a derivative name of the mobile device, the derivative name being formed from a configured device name, the derivative name including a portion that indicates that the mobile device is ready for connections; and
        waiting for a connection request from the second device.

11. The method of claim 10, wherein detecting the motion comprises receiving accelerometer data indicating that the mobile device is being shaken.

12. The method of claim 10, wherein detecting the motion comprises receiving accelerometer data indicating that the mobile device has been moved from a resting position.

13. The method of claim 10, wherein allowing the wireless connection to be established comprises:
activating an advertising protocol; and
waiting for a connection request from the second device.

14. The method of claim 13, wherein activating the advertising protocol comprises powering on a radio system.

15. The method of claim 14, wherein the radio system comprises a Bluetooth radio.

16. The method of claim 14, wherein powering on the radio system comprises activating a Bluetooth adapter.

17. The method of claim 13, wherein activating the advertising protocol comprises waking the mobile device from a sleep mode.

18. The method of claim 10, further comprising disabling wireless connections after a threshold time of no detected motion.

19. The method of claim 10, wherein the configured name is used when the mobile device is not ready for connections.

20. At least one non-transitory machine-readable medium including instructions, which when executed by a machine, cause the machine to:
detect motion at a mobile device; and
allow a wireless connection to be established between the mobile device and a second device in response to the motion being
wherein the instructions to allow the wireless connection to be established comprise instructions to:
broadcast an advertisement with a payload indicating that the mobile device is ready for connections, wherein the payload comprises a derivative name of the mobile device, the derivative name being formed from a configured device name, the derivative name including a portion that indicates that the mobile device is ready for connections; and
wait for a connection request from the second device.

21. The at least one non-transitory machine-readable medium of claim 20, wherein the instructions to detect the motion comprise instructions to receive accelerometer data indicating that the mobile device is being shaken.

22. The at least one non-transitory machine-readable medium of claim 20, wherein the instructions to activating the advertising protocol comprise instructions to power on a radio system.

23. The at least one non-transitory machine-readable medium of claim 20, wherein the configured name is used when the mobile device is not ready for connections.

* * * * *